May 25, 1965   F. D. CATLIN   3,184,996
INDEXING MEANS FOR TURRETS
Filed Oct. 31, 1961   2 Sheets-Sheet 1
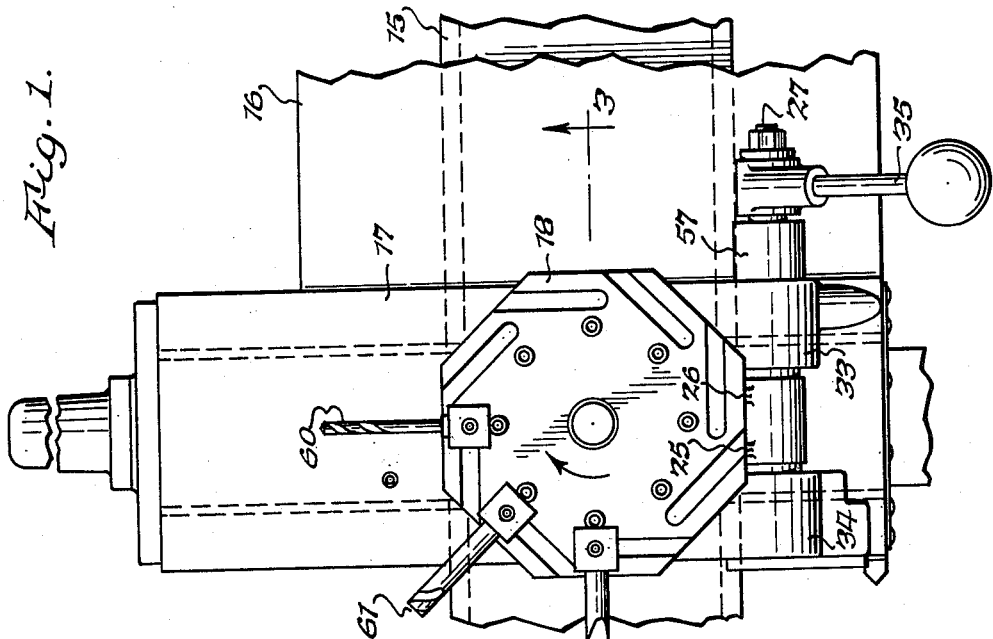
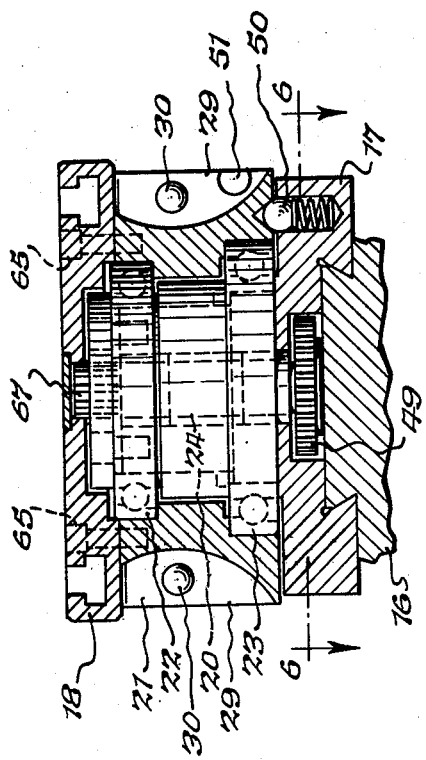
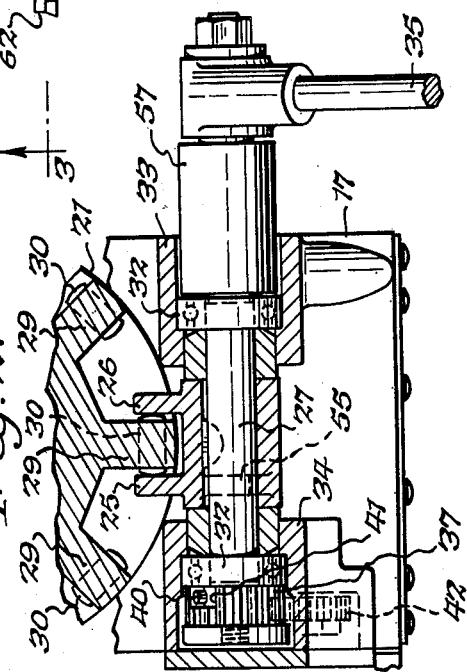
INVENTOR.
Francis D. Catlin
BY
ATTORNEYS.

May 25, 1965 F. D. CATLIN 3,184,996
INDEXING MEANS FOR TURRETS
Filed Oct. 31, 1961 2 Sheets-Sheet 2
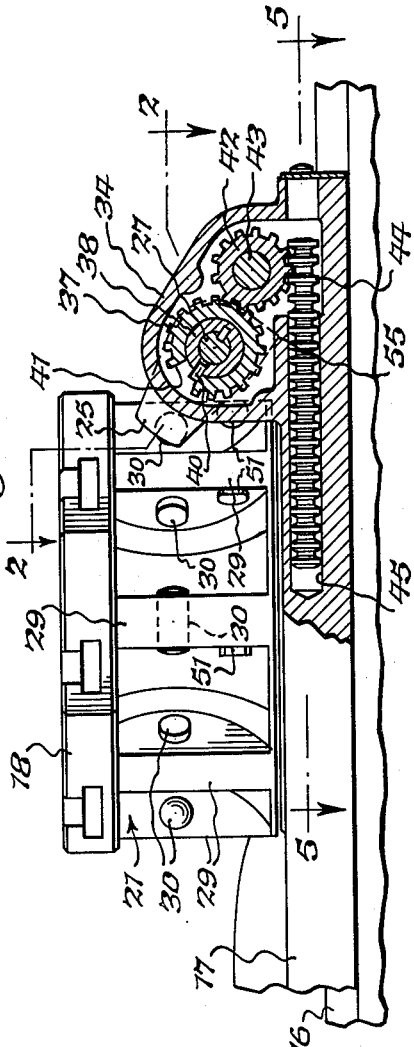
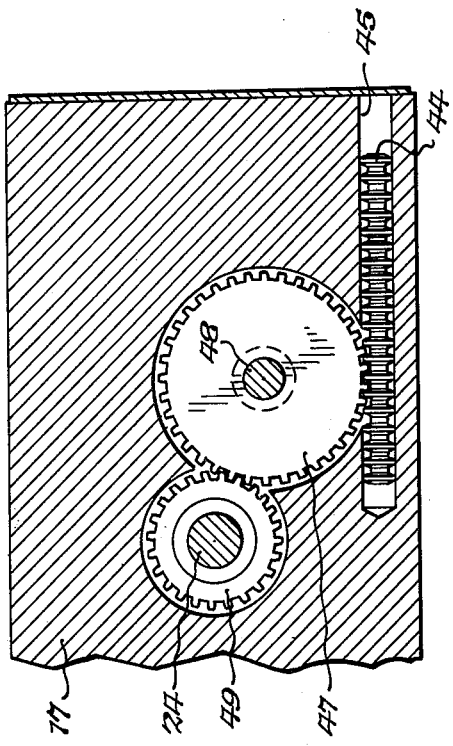
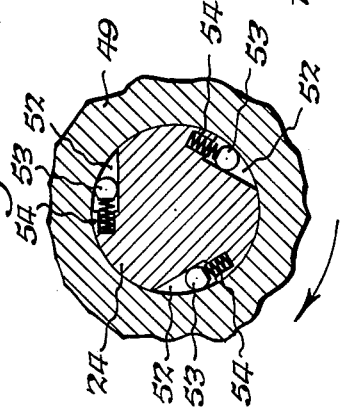
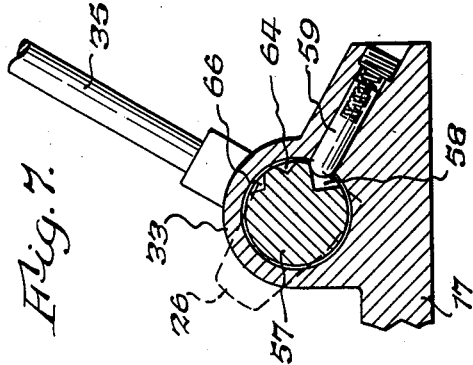
INVENTOR.
Francis D. Catlin
BY
ATTORNEYS.

3,184,996
INDEXING MEANS FOR TURRETS
Francis D. Catlin, Horseheads, N.Y., assignor to
Hardinge Brothers, Inc., Elmira, N.Y.
Filed Oct. 31, 1961, Ser. No. 148,944
5 Claims. (Cl. 74—822)

This invention relates to devices for indexing turrets such as may be used on lathes or other machine tools.

Heretofore turrets have been locked in any one or other of their operative positions, and in order to advance the turret to another station, it was first necessary to release the locking means and then turn the turret to advance the same into another position, whereupon the turret was again locked.

One of the objects of this invention is to provide a mechanism by means of which the locking and releasing of a turret and the advancing of the same to another station in a single operation is possible.

It is also an object of this invention to provide means whereby the indexing and locking of a turret may be carried out by means of air-controlled or other power-actuated mechanism.

A further object is to provide a turret actuating mechanism by means of which the return of the turret to a starting position may be effected manually.

In the accompanying drawings:

FIG. 1 is a fragmentary, top plan view of a turret embodying this invention showing the same mounted on the bed of a lathe.

FIG. 2 is a fragmentary, sectional plan view thereof on an enlarged scale on line 2—2, FIG. 4.

FIG. 3 is a sectional elevation thereof on line 3—3, FIG. 1, without any of the cutting tools mounted on it.

FIG. 4 is a side elevation thereof, partly broken away, to show some of the mechanism.

FIG. 5 is a sectional plan view thereof on line 5—5, FIG. 4.

FIG. 6 is a sectional plan view thereof on line 6—6, FIG. 3.

FIG. 7 is a fragmentary, sectional elevation showing clutch or ratchet means for holding a locking lever in the desired position.

The invention is shown in the drawings as particularly applied to a turret of a lathe, but it will be understood that the turret actuating mechanism embodying this invention may be applied to machines other than lathes.

15 represents the bed of the lathe on which the usual carriage 16 is mounted which supports the transversely movable base 17 of the turret. The turret includes a head 16 secured to a downwardly extending, annular part or skirt 21 which is mounted to rotate on an upwardly extending, annular hub 20 formed integral with the base. The turret is mounted on this hub by ball bearings 22 and 23. A central, turret-advancing shaft 24 is also provided for the turret and is journalled within the hub 20 in any suitable manner and splined at 67 to the head 18 of the turret, which is secured by cap screws 65 to the skirt part 21. By means of this construction a very secure mounting of the turret results with all the forces acting on the turret being directly transmitted to the base or hub on the base, and none of the forces being transmitted to the turret rotating means hereinafter described.

The turret is locked in the desired position by means of a locking wedge comprising a pair of fingers 25 and 26 secured on a shaft 27 suitably journalled on the base of the turret. These fingers straddle ribs or projections 29 of the skirt and interlock wtih hardened pins 30 supported by the projections so as to securely wedge the turret in its correct positions. This shaft 27 is journalled by means of ball bearings 32 in bearing brackets 33 and 34 formed integral with and extending upwardly from the base of the turret. The shaft is provided at one end thereof with a suitable handle or lever 35 by means of which it can be turned. Consequently, by rotating the turret until one of the ribs 29 of the skirt is in approximately operative relation to the locking fingers 25 and 26, the lever is then swung into a position in which these fingers straddle the rib and engage the pin 30 secured thereto for accurately and securely locking the turret in the desired position. The ball bearings 22, 23 and 32 are preferably preloaded so that the turret will operate at a high degree of rigidity.

The turret locking means similar to those above described have been heretofore used. In accordance with this invention, however, it is desired to combine the rotation and locking of the turret into one operation. In the construction shown in FIGS. 1-7, this is effected by means of gears which are rotated through the turning of the locking shaft 27. These gears include a gear 37 rotatably mounted on a sleeve 38 which is keyed or otherwise secured to the locking shaft 27. The gear 37 is rotated by the shaft 27 through the medium of a pin or projection 40 secured on the sleeve 38 and extending outwardly therefrom into a gap or slot 41 in the periphery of the gear 37. Consequently, it will be obvious that the shaft 27 may be turned by means of the handle 35 to a slight extent before imparting rotation to the gear 37 so that this lost motion enables the locking fingers to be disengaged from the turret before it is rotated.

The gear 37 meshes with a gear 42 mounted on a shaft 43 also journalled in the bearing housing 34. The gear 42 meshes with a rack bar 44 which has annular teeth and which is slidable lengthwise in a hole or passage 45 formed in the base of the turret. The rack bar also meshes with a gear 47 having its axis approximately at a right angle to the axes of the gears 37 and 42 and rotatable about the axis of an upright pin 48 secured in the base. This gear 47 meshes with another gear 49 concentric wtih the central shaft 24 of the turret.

Rotation is imparted from the gear 49 to the central shaft 24 of the turret by means of a clutch or ratchet device permitting rotation in one direction by the turning of handle 35 but leaving the turret stationary when the handle is turned in the opposite direction. This clutch or ratchet mechanism also leaves the turret free to be rotated by hand in the same direction as when using the handle 35. In the construction shown for this purpose, the shaft 24 is provided with a plurality of recesses 52 inclined toward the axis of the shaft and in which pins 53 are arranged, each of which is urged by a spring 54 into position to become wedged between the inner periphery of the internal bore of the gear 49 through which the shaft 24 extends and a wall of the inclined recess of the shaft. Any other ratchet connection may be employed between the shaft and the turret. Consequently, when the gear 49 is turned in one direction, as indicated by the arrow in FIG. 6, the turret will be turned by the gearing described through the ratchet or clutch mechanism. When the gear 49 is turned in the reverse direction, no motion will be imparted to the turret shaft because of this ratchet mechanism.

In the operation of the mechanism thus far described, assuming that the turret is locked in one of the its stations, the hand lever 35 is swung toward the operator to turn the shaft 27. During this initial turning, the wedging fingers 25 and 26 will be moved out of locking position while the pin 40 moves through the opening 41 in the gear 37. When the locking fingers are thus moved out of locking position, further turning of the lever 35 will turn the gears 37 and 42 which will move the rack bar 44 in one direction and impart rotation to the gears 47 and 49, thus turning the turret. The hand lever is then swung back into its turret-locking position, and this return movement of the hand lever will produce no rotation of the gears in the opposite direction until after the pin 40 has passed through the slot or gap 41 in the gear 37. After further movement of the lever 35 because of the ratchet mechanism shown in FIG. 6, no motion will be imparted to the shaft 24 or the turret, which is then locked in correct position by means of the fingers 25 and 26.

Preferably means are provided for yieldingly holding the turret in any of its operative positions, such for example, as a spring pressed ball detent 50, FIG. 3, which enters into any of the shallow recesses in the lower surface of the skirt of the turret, each recess being provided for each station of the turret and the ball being so located that when it enters a recess, the turret is closely positioned in one of its operative positions. The ball will of course easily move out of a recess when the turret is advanced.

In order to prevent over travel of the turret, due to such rapid turning of the same that the ball detent 50 cannot hold it in its new position, I have provided a stop projection 55 mounted on the same sleeve or bushing of the shaft 27 which carries the locking fingers 25 and 26 and positioned to move into position to move into the path of movement of any of the ribs 29 of the skirt of the turret when the locking fingers are withdrawn out of locking engagement, to stop rotation of the turret beyond its next station. Hardened stop buttons 51 are preferably provided on the ribs 29 to engage with the stop projection 55.

Means are also preferably provided for yieldingly holding the shaft 27 and the handle 35 in turret-locking position or released positions. In the construction shown for this purpose, I have provided an extension 57 of the shaft 27, FIG. 7, integral therewith and having a V-shaped notch 58 in its periphery with which the spring-pressed plunger 59 cooperates to yieldingly resist turning of the shaft 27 out of its turret-locking position. This plunger is pressed against one of the inclined wall of the recess or notch 58 so that it tends to urge the shaft 27 into locking position and to yieldingly oppose turning of the shaft in the opposite direction. Other notches are provided in the extension 57 to yieldingly hold the shaft 27 and the hand lever 35 in different positions. For example, a notch 64 may be provided to hold the handle and the shaft 27 in unlocking position in which the fingers 25 and 26 are out of engagement with the turret, but before the gears for turning the turret have been turned, and a third notch 66 serves to hold the handle in the position which it occupies after the turret has been advanced to its new station. It may be desired to turn the turret manually into another position while the pin 59 is in the notch 64, for example, to start a cycle of operations if the number of tools on the turret is relatively few. As shown in FIG. 1, three different tools 60, 61 and 62 are provided, and the other tool-receiving positions on the turret contain no tools. Consequently, after the three operations are performed on the work-piece, instead of turning the turret by means of the handle 35 through the five different empty positions to again start operation of another workpiece, the handle 35 can be swung into engagement with the recess or notch 64 in the extension 57. During this swinging of the handle, the pin 40 is moved only to the extent permitted by the opening or recess 41 in the gear 37, thus moving the locking fingers out of engagement with the turret without turning any of the gears for advancing the turret. This leaves the turret free to be turned by having the operator grasp the turret and turning it in the same direction as the gear would turn it to place the tool 60 past the untooled positions and back into the starting position.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A turret assembly which is unlocked and then indexed by a common activating mechanism, comprising,
    (a) a turret which is rotatably supported on a frame and has a plurality of work stations,
    (b) a locking means on said frame which is engageable with said turret so that any one of said work stations may be held in fixed operative position,
    (c) said locking means being movable in and out of engagement with said turret so that the turret may be rotated when the locking means is not in engagement therewith,
    (d) turret moving means directly connected to said turret and including a gear mechanism so that any mechanical movement of any part thereof will act to turn said turret in a given direction,
    (e) a shaft forming a common activating means mechanically connected to both said turret moving means and said locking means for disengaging said locking means from said turret and moving said indexing means, and
    (f) lost motion means connected between said shaft activating means and said turret moving means which allows initial movement of the shaft in a given direction to first disengage said locking means from said turret while transmitting no moving force to said turret through said moving means, and then on further movement of said shaft said lost motion means transmitting mechanical force to said turret to index it to the next work station after said turret has been unlocked, so that the turret is unlocked and indexed in a single movement of said common activating means.

2. A turret assembly which is unlocked and then indexed by a common activating mechanism, comprising,
    (a) a turret which is rotatably supported on a frame and has a plurality of work stations,
    (b) a locking means on said frame which is engageable with said turret so that any one of said work stations may be held in fixed operative position,
    (c) said locking means being movable in and out of engagement with said turret so that the turret may be rotated when the locking means is not in engagement therewith,
    (d) a rack and pinion assembly mechanically connected to said turret through a gear so that movement of said rack will rotate said gear and in turn said turret,
    (e) shaft activating means mechanically connected to said locking means so that movement of said shaft activating means will disengage said locking means from said turret, and
    (f) lost motion means connecting said shaft activating means and said reciprocable rack for allowing initial movement of said shaft activating means to first disengage said locking means from said turret while transmitting no moving force to said turret through said rack and pinion, and said lost motion means transmitting mechanical force to said turret to index it to the next work station after said turret has been unlocked, so that the turret is unlocked and indexed in a single movement of the shaft activating means.

3. A turret assembly which is unlocked and then indexed by a common activating mechanism, comprising,
    (a) a turret which is rotatably supported on a frame and has a plurality of work stations,
    (b) a locking means on said frame which is engageable with said turret so that any one of said work stations may be held in fixed operative position,
    (c) said locking means being movable in and out of engagement with said turret so that the turret may be rotated when the locking means is not in engagement therewith, (d) turret indexing means mounted on said frame and connected to said turret to successively move said turret in a given direction from one work station to another, (e) a common activating means mechanically connected to both said indexing means and said locking means for disengaging said locking means from said turret and for moving said indexing means, (f) a gear forming a part of said indexing means which is mounted for rotation on a shaft, said gear having a circumferentially extending opening adjacent the surface of said shaft, (g) said shaft having a projection extending upwardly from said shaft and into said opening, said projection being movable circumferentially within said opening, and (h) said shaft forming part of said common activating means, whereby initial movement of said activating means unlocks said locking means and simultaneously rotates said shaft, moving said projection along in said circumferentially extending opening without turning said gear to transmit mechanical force to said turret, but after said projection reaches the end of said circumferentially extending opening completing said initial movement, the projection imparts rotational force to said gear which then transmits mechanical force through said indexing means to index said turret to the next work station.

4. A turret assembly which is unlocked and then indexed by a common activating mechanism, comprising, (a) a turret which is rotatably supported on a frame and has a plurality of work stations, (b) a locking means on said frame which is engageable with said turret so that any one of said work stations may be held in fixed operative position, (c) said locking means being movable in and out of engagement with said turret so that the turret may be rotated when the locking means is not in engagement therewith, (d) a reciprocable rack member mounted on said frame and mechanically connected to said locking means through a gear train, (e) a gear assembly connected to said reciprocable rack and which is turned by movement of said reciprocable rack, and (f) lost motion means mechanically connected to said gear assembly and said turret which allows initial movement of said reciprocable rack member and said gear assembly while transmitting no force to said turret until sufficient movement has been imparted to said locking means to disengage it from said turret, said lost motion means then transmitting mechanical force to said turret to index it to the next work station, so that the turret is unlocked and indexed by movement of the said reciprocable rack member, and (g) power means connected to said reciprocable rack to move it from one position to another.

5. An indexing assembly for a machine tool, comprising, (a) a turret which is rotatably supported on a frame that has a plurality of work stations, (b) an elongated rotatable shaft which is mounted on said frame, (c) a locking means on said frame which is engageable with said turret so that any one of said work stations may be held in fixed operative position, said locking means being moveable in and out of engagement with said turret so that the turret may be rotated when the locking means is not in engagement therewith, (d) turret indexing means mounted on said frame and connected to said turret to successively move said turret in a given direction from one work station to another, (e) a gear forming a part of said indexing means and which is mounted for rotation on said shaft, said gear having a circumferentially extending opening adjacent the surface of said shaft, (f) said shaft having a projection extending upwardly from said shaft and into said opening, said projection being moveable circumferentially within said opening of said gear, whereby initial rotative movement of said shaft unlocks said locking means and moves said projection along in said circumferentially extending opening without turning said gear to transmit mechanical force to said turret, but after said projection reaches the end of said circumferentially extending opening to complete said initial movement, the projection imparts rotational force to said gear which then transmits mechanical force through said indexing means to index said turret to the next work station, and (g) a one way clutch assembly forming a part of said turret indexing means and which is connected to said turret so that the turret indexing means may be returned to initial position on return movement of said shaft without changing the position of said turret, said one way clutch assembly also permitting manual indexing of said turret.

References Cited by the Examiner

UNITED STATES PATENTS

| 632,905 | 9/99 | Swasey | 74—822 X |
| 886,719 | 5/08 | Murray | 74—822 |
| 1,469,051 | 9/23 | Poitras | 74—822 |
| 1,737,002 | 11/29 | DeVlieg | 74—822 |
| 1,964,351 | 6/34 | Haas | 74—822 |
| 2,088,687 | 8/37 | Carlsen | 74—822 |
| 2,386,432 | 10/45 | Bullock | 74—822 |
| 2,392,964 | 1/46 | Armitage | 74—822 |
| 2,660,895 | 12/53 | Waters | 74—142 X |
| 2,826,099 | 3/58 | Scholin | 74—822 |
| 2,905,029 | 9/59 | Gustafson | 74—822 X |
| 2,968,973 | 1/61 | Mead | 74—822 |

FOREIGN PATENTS 868,530  5/61  Great Britain.

BROUGHTON B. DURHAM, *Primary Examiner,*